United States Patent
Polus

[11] 3,728,957
[45] Apr. 24, 1973

[54] BAKING SHIELD

[76] Inventor: Louise Polus, 109 Slack Drive, Anderson, Ind. 46013

[22] Filed: Dec. 2, 1971

[21] Appl. No.: 204,127

[52] U.S. Cl. ........................99/433, 99/447, 126/39
[51] Int. Cl. ..............................................A47j 37/01
[58] Field of Search..............................99/447, 433; 126/39 M; 220/3.5 MF

[56] References Cited

UNITED STATES PATENTS

| | | | |
|---|---|---|---|
| 1,375,539 | 4/1921 | Scott | 99/447 |
| 1,834,402 | 12/1931 | Houston | 99/433 X |
| 2,030,344 | 2/1936 | Young | 99/433 X |
| 2,077,868 | 4/1937 | Adams | 99/433 X |
| 2,174,425 | 9/1939 | Schlumbohm | 126/39 M UX |
| 3,431,836 | 3/1969 | Murrell | 99/433 |

FOREIGN PATENTS OR APPLICATIONS

| | | | |
|---|---|---|---|
| 999,165 | 7/1965 | Great Britain | 99/447 |

*Primary Examiner*—Billy J. Wilhite
*Assistant Examiner*—Arthur O. Henderson
*Attorney*—Robert A. Spray

[57] ABSTRACT

A baking shield for a pie pan, the shield in use extending peripherally around the pie pan and having an outer member of foil or foil-like flexible sheeting which is folded around the outer edge of the pie pan, thus blocking heat to the pie crust periphery and thus permitting a more desirable thoroughness of the pie baking process without burning or charring the outer edge or periphery of the pie crust.

9 Claims, 6 Drawing Figures

PATENTED APR 24 1973

3,728,957

LOUISE POLUS,
         INVENTOR.

BY Robert A. Spray

ATTORNEY

PATENTED APR 24 1973 3,728,957

BAKING SHIELD

This invention relates to a re-usable baking shield for the cooking or baking of pastries, particularly pies, and especially frozen pies.

It is of course well known that a prime difficulty of pie baking is that of charring the outer edge or periphery of the pie crust if sufficient heat is supplied to bake or cook the pie to the desired throughness. Particularly is this a difficulty when the "baking" is the attempting thorough warming of a pie which has been distributed and stored as a frozen pie; and thus the present invention is particularly useful with frozen pies.

The main portions of a pie crust are of course supported by the associated pie pan; and, even if the pie pan is of a type which has some holes for attempting to transmit more of the baking heat to the central portions of the pie, the pie pan blocks so much of the heat that if sufficient heat is nevertheless supplied to thoroughly bake the pie, the outer portions of the crust edge are often charred or burned.

Conversely, to avoid the undersired charring or burning of the outer edge of the pie crust, it is generally necessary in present pie-baking procedures to unduly limit the heat supplied, a limitation of heat often so much that either the pie filling or the central portions of the pie crust are to a degree undercooked and thus not as tasty or otherwise desirable.

The charring of the outer edges of the pie crust is objectionable from both the aspects of appearance and taste. Many persons leave the outer crust edge portion uneaten, if the pie is thoroughly cooked but with the outer crust edges charred.

Consequently, much pie-baking involves an attempt at a rather exact compromise, leaving the central portions of the pie and crust not quite fully cooked, and leaving the outer crust edges not quite overcooked.

It is known that many cooks take great pride in their cooking ability, and they are quite disappointed in the results of pie baking in which this exacting compromise is not adequately achieved. Many cooks feel insulted if their families or guests do not find the cooking to be substantially perfect; and the difficulty of producing sufficiently-perfect pastries has no doubt caused many and repeated disappointments and embarrassment.

Many members of the families and guests (here referring of course primarily to the children and adult males) do not themselves cook pies, and thus they are unknowledgeable as to the difficulty of baking a thoroughly baked pie without the corresponding overcharring of the pie crust edges. Thus, even though their criticism, or even imagined criticism, is really not deserved by the cook, nevertheless there may be criticism; and whether such criticism is real or merely imagined by the cook, it is an undesirable thing.

Accordingly, concepts of the present invention provide a convenient, economical, and effective baking shield which conveniently and effectively shields the crust edges an amount to generally avoid the above-mentioned disadvantages, generally avoid the necessity of the exact compromise which even if precisely obtained is nevertheless a compromise, and to correspondingly permit the cook to consistently turn out generally perfect pies which are thoroughly cooked yet which do not have the pie crust edges unduly charred.

The above description is of an introductory and background nature. More specific concepts and details are set forth in the following description of embodiments illustrative of the inventive concepts, taken in conjunction with the accompanying somewhat schematic drawings, in which.

Figure 1:
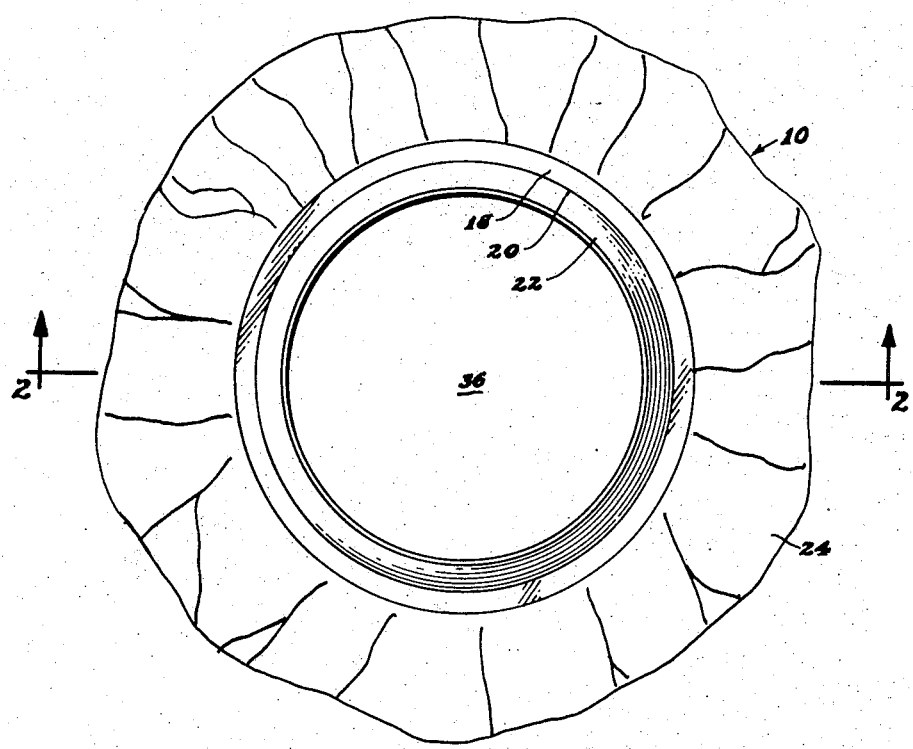
FIG. 1 is a plan view of a baking shield according to the inventive concepts.
Figure 2:
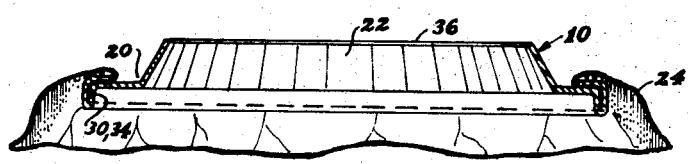
FIG. 2 is a cross-sectional view thereof, taken generally along section-line 2—2 of FIG. 1.

As shown in the drawings, the invention provides a baking shield 10 for association with an associated baking pan 12. The pan is shown of conventional metallic construction, having a laterally-protruding rim 14 extending outwardly from the vertically-extending pie pan wall 16.

The shield 10 is shown as having an outer, laterally-extending rim member 18; and extending upwardly from the inner periphery 20 of the shield's outer rim 18 is an upstanding shielding wall 22. The wall 22 extends upwardly and inwardly a short distance, that is, about an amount equal to or less than the height of the pie pan wall 16.

Figure 5:
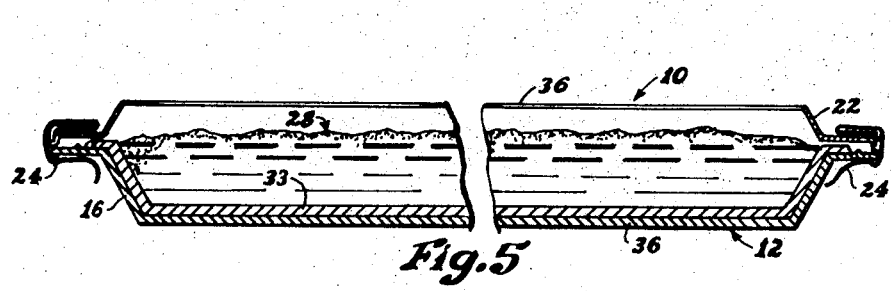
FIG. 5 is a cross-sectional view illustrating the baking shield in its assembled position on a pie pan, in a condition for the baking of the pie shown illustratively in the pie pan.
Figure 6:
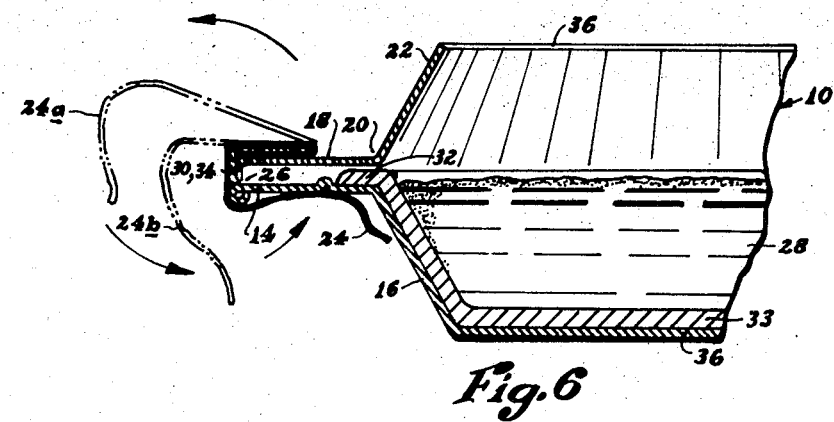
FIG. 6 is an enlarged detail view of a portion of FIG. 5, illustrating details in larger scale and illustrating the procedural step of assembly of the baking shield onto the pie pan.

There is a body member or piece of flexible sheeting 24 operatively secured to the said baking shield 10; and, as shown more particularly in FIG. 5 and 6, the sheeting 24 has a form and shape such that it may be operatively folded over and around the peripheral junction 26 of the baking shield 10 and the rim 14 of the pie pan 12. Thereby, there is attained a sufficient and effective baffling or shielding of the baking heat from the pie or pastry 28 being baked, by operatively blocking heat flow to the pastry 28 through a path including the said junction 26.

As shown, a support means 30 is provided which supports said baking shield 10 in a manner such that its laterally-extending rim member 18 is spaced from the baking pan rim 14 an amount sufficient that the outer edge or peripheral crust portion 32 of the crust 33 of the pie or pastry 28 may extend onto the pie pan rim 14.

This support means 30 is shown as provided by an integral downward extension 34 of the said baking shield's laterally-extending outer rim member 18.

In the embodiments shown, the said flexible sheeting 24 is secured to the laterally-extending rim member 18 of the said baking shield 10.

The central portion 36 of the baking shield 10 is open for at least most of its entire span between oppositely located portions of upwardly-extending shielding wall 22, permitting the baking heat to reach downwardly onto the upper surface of the pie 28.

Desirably and economically, the said baking shield 10 is formed from a baking pan substantially like the said associated baking pan 12 except for having its central portion 36 cut away to provide the said spanning opening.

Figures 3, 4:
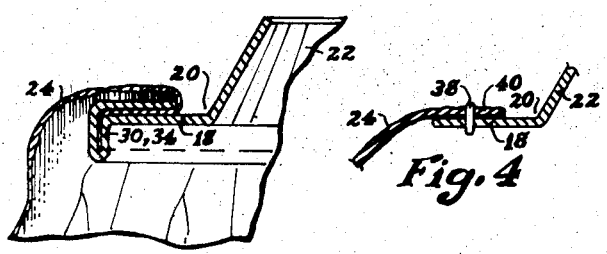
FIG. 3 is a detail view of a portion of FIG. 2, in larger scale.
FIG. 4 is a fragmental detail view of a portion of the baking shield as in FIG. 3, but illustrating an embodiment in which stapling is used.

As shown in FIG. 4, the said flexible sheeting 24 is desirably secured to the baking shield 10 by stapling 38 operatively extending between an inner portion 40 of said sheeting 24 and the said laterally-extending rim member 18 of the baking shield 10.

In the embodiments shown, the said flexible sheeting 24 is metallic foil.

The shield 10 is shown with a conventional pie pan 12 whose rim 14 both stiffens the pan 12 and provides a supporting means for the periphery 32 of the crust 33 of the pie 28 being baked therein, and it is the pie pan rim 14 which is operatively engaged in heat-baffling relationship by the said flexible sheeting 24 of the said baking shield 10. The assembly of the pie pan 12 and shield 10 is best shown in FIG. 6, where it will be noted that the shield 10 is seated upon the pie pan 12, with the downturned lip or rim 34 of the shield rim 18 resting on the pie pan rim 14; and then the sheeting 24 is folded (as indicated by the directional arrows in FIG. 6 and by the intermediate position-designations 24a and 24b) over and around the outer junction 26 of the shield rim 18 and pie pan rim 14 and tucked under the pie pan rim 14.

Thus it will be seen that the present inventive concepts provide a baking shield having the advantages of effectiveness, convenience, and economy, generally avoiding disadvantages of present pie-baking efforts and producing consistently better pies with thorough cooking of the pie without charring or burning the outer crust portions.

Accordingly, it will thus be seen from the foregoing description of the invention according to these illustrative embodiments, considered with the accompanying drawings, that the present invention provides a new and useful baking shield having desired advantages and characteristics, and accomplishing its intended objects, including those hereinbefore pointed out and others which are inherent in the invention.

It will be understood that modification and variations may be effected without departing from the scope of the novel concepts of the present invention; accordingly, the invention is not to be considered limited to the specific form or arrangement herein described and shown.

What is claimed is:

1. A baking shield for association with an associated baking pan having a laterally-protruding rim extending outwardly from a vertically-extending wall, said baking shield comprising:

a laterally-extending rim member, having extending upwardly from the inner periphery thereof a shielding wall, there being flexible sheeting operatively secured to the said baking shield, and the said sheeting having a form and shape such that it may be operatively folded over and around the peripheral junction of the baking shield and the said associated baking pan's laterally-protruding rim, thereby baffling or shielding the baking heat from the pastry being baked by operatively blocking heat flow to the pastry through a path including the said junction.

2. The invention as set forth in claim 1 in a combination in which support means are provided which support said baking shield in a manner such that its laterally-extending rim member is spaced from the baking pan's laterally-protruding rim an amount sufficient that a peripheral crust portion of the said pastry may extend onto said pan's laterally-protruding rim member.

3. The invention as set forth in claim 2 in a combination in which said support means comprise an integral downward extension of said baking shield's laterally-extending rim member.

4. The invention as set forth in claim 1 in a combination in which the said flexible sheeting is secured to the laterally-extending rim member of the said baking shield.

5. The invention as set forth in claim 1 in a combination in which the baking shield is open for at least most of its entire span between its said upwardly-extending shielding wall.

6. The invention as set forth in claim 5 in which the said baking shield is formed from a baking pan substantially like the said associated baking pan except for having its central portion cut away to provide the said spanning opening.

7. The invention as set forth in claim 1 in which the said flexible sheeting is secured to the baking shield by stapling operatively extending between an inner portion of said sheeting and the said laterally-extending rim member of said baking shield.

8. The invention as set forth in claim 1 in which the said flexible sheeting is metallic foil.

9. The invention as set forth in claim 1 in which the baking pan is a pie pan, and the laterally-protruding rim thereof is the pie pan rim which both stiffens the pan and provides a supporting means for the periphery of the crust of the pie being baked therein, and it is said pie pan rim which is operatively engaged in heat-baffling relationship by the said flexible sheeting of the said baking shield.

* * * * *